(12) United States Patent
Autechaud et al.

(10) Patent No.: US 6,202,108 B1
(45) Date of Patent: Mar. 13, 2001

(54) PROCESS AND SYSTEM FOR INITIALIZING A SERIAL LINK BETWEEN TWO INTEGRATED CIRCUITS COMPRISING A PARALLEL-SERIAL PORT USING TWO CLOCKS WITH DIFFERENT FREQUENCIES

(75) Inventors: Jean-Francois Autechaud; Christophe Dionet, both of Paris (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/171,435

(22) PCT Filed: Feb. 18, 1998

(86) PCT No.: PCT/FR98/00312
§ 371 Date: Oct. 19, 1998
§ 102(e) Date: Oct. 19, 1998

(87) PCT Pub. No.: WO98/37494
PCT Pub. Date: Aug. 27, 1998

(30) Foreign Application Priority Data

Mar. 13, 1997 (FR) .................................................. 97 02974

(51) Int. Cl.$^7$ .................................................. G06F 13/14
(52) U.S. Cl. .......................... 710/61; 341/100; 341/101; 341/106; 358/1.18
(58) Field of Search ........................ 710/61; 341/100, 341/101, 106; 358/1.18

(56) References Cited

U.S. PATENT DOCUMENTS

| | | | |
|---|---|---|---|
| 4,577,317 | 3/1986 | Chu et al. | 370/110.1 |
| 4,965,797 | * 10/1990 | Yamane et al. | 370/537 |
| 5,023,870 | * 6/1991 | Kem | 370/445 |
| 5,255,293 | * 10/1993 | Archer et al. | 375/372 |
| 5,522,088 | 5/1996 | Halma | 710/61 |
| 5,544,319 | 8/1996 | Acton et al. | 395/200.07 |
| 5,548,623 | * 8/1996 | Casper et al. | 375/358 |
| 5,598,442 | * 1/1997 | Gregg et al. | 375/354 |
| 5,613,068 | * 3/1997 | Gregg et al. | 709/216 |
| 5,651,033 | * 7/1997 | Gregg et al. | 375/354 |
| 5,694,612 | * 12/1997 | Garmire et al. | 712/11 |
| 5,757,297 | * 5/1998 | Ferraiolo et al. | 341/100 |
| 5,787,094 | * 7/1998 | Cecchi et al. | 714/807 |
| 5,832,047 | * 11/1998 | Ferraiolo et al. | 375/356 |
| 5,894,570 | * 4/1999 | Barkey et al. | 713/1 |
| 5,907,684 | * 5/1999 | Halma et al. | 709/237 |
| 5,964,866 | * 10/1999 | Durham et al. | 712/200 |
| 5,968,137 | * 10/1999 | Ferraiolo et al. | 710/5 |
| 5,968,179 | * 10/1999 | Barkey et al. | 713/400 |
| 6,018,305 | * 1/2000 | Kikuchi et al. | 341/100 |

\* cited by examiner

*Primary Examiner*—Thomas C. Lee
*Assistant Examiner*—Abdelmoniem Elamin
(74) *Attorney, Agent, or Firm*—Miles & Stockbridge P.C.; Edward J. Kondracki

(57) ABSTRACT

A process for initializing a serial link between two integrated circuits comprises an initialized input-output port associated with each integrated circuit connected between a parallel bus and a serial link. Each port uses two clocks with different frequencies, a first higher-frequency clock for the serial link, called a transmitting clock, and a second lower-frequency clock for the signals arriving from the parallel bus, called a system clock. The process comprises the following steps:

- reinitializing the port with isolation of the receiving clock logic;
- reinitializing the transmitting clock logic;
- resetting the serial link between two ports; and
- initializing a two-way serial link by a looped process, either automatic or dependent on a microprocessor.

22 Claims, 10 Drawing Sheets

CRC is updated—9-bit data byte.CRC calculation

Data= D1 D2 D3 D4 D5 D6 D7 D8 after N bytes:

$CRC_N$=R16 R15 R14 R13 R12 R11 R10 R9 R8 R7 R6 R5 R4 R3 R2 R1 after N+1 bytes:

| $CRC_N$= | S16 | S15 | S14 | S13 | S12 | S11 | S10 | S9 | S8 | S7 | S6 | S5 | S4 | S3 | S2 | S1 |
|---|---|---|---|---|---|---|---|---|---|---|---|---|---|---|---|---|
| | = | = | = | = | = | = | = | = | = | = | = | = | = | = | = | = |
| | | | | | | | | | | R16 | R15 | R14 | R13 | R12 | R11 | R10 |
| | | | | | | | | | | ⊕ | ⊕ | ⊕ | ⊕ | ⊕ | ⊕ | ⊕ |
| | X9 | X8 | X7 | X8 | X7 | X6 | X5 | X4 | X3 | X2 | X1 | | | | | X9 |
| | ⊕ | ⊕ | ⊕ | ⊕ | ⊕ | ⊕ | ⊕ | ⊕ | ⊕ | ⊕ | ⊕ | | | | | ⊕ |
| | X8 | X7 | X6 | X7 | X6 | X5 | X4 | X3 | X2 | X1 | | | | | | X8 |
| | ⊕ | ⊕ | | | | | | | | | | | | | | ⊕ |
| | X7 | X6 | | | | | | | | | | | | | | X7 |
| | ⊕ | ⊕ | | | | | | | | | | | | | | ⊕ |
| | X6 | X5 | | | | | | | | | | | | | | X6 |
| | ⊕ | ⊕ | | | | | | | | | | | | | | ⊕ |
| | X5 | X4 | | | | | | | | | | | | | | X5 |
| | ⊕ | ⊕ | | | | | | | | | | | | | | ⊕ |
| | X4 | X3 | | | | | | | | | | | | | | X4 |
| | ⊕ | ⊕ | | | | | | | | | | | | | | ⊕ |
| | X3 | X2 | | | | | | | | | | | | | | X3 |
| | ⊕ | ⊕ | | | | | | | | | | | | | | ⊕ |
| | X2 | X1 | | | | | | | | | | | | | | X2 |
| | ⊕ | | | | | | | | | | | | | | | ⊕ |
| | X1 | | | | | | | | | | | | | | | X1 |

(With $X_i = D_i \oplus R_i = D_i$ XOR $R_i$)

FIG. 5

PROCESS AND SYSTEM FOR INITIALIZING A SERIAL LINK BETWEEN TWO INTEGRATED CIRCUITS COMPRISING A PARALLEL-SERIAL PORT USING TWO CLOCKS WITH DIFFERENT FREQUENCIES

CROSS REFERENCE TO RELATED APPLICATION:

The subject matter of this application is related to the subject matter of pending application Ser. No. 09/020,671 filed Feb. 7, 1998, in the names of Jean-Francois Autechaud and Christopher Dionet and entitled "Device and Process For Detecting Errors In An Integrated Circuit Comprising A Parallel-Serial Port" and application Ser. No. 09/102,023, filed Jun. 22, 1998, in the names of Jean-Francois Autechaud and Christophe Dionet and entitled "Process For Detecting Errors In A Serial Link Of An Integrated Circuit And Device For Implementing The Process". Said applications are assigned to the assignee of the present invention, and the subject matter of said applications is hereby incorporated by reference in its entirety.

BACKGROUND OF THE INVENTION

FIELD OF THE INVENTION;

The present invention relates to a process for initializing a serial link between two integrated circuits comprising a parallel-serial and serial-parallel port, two ports have been previously initialized, and the device which allows the process to be implemented.

SUMMARY OF THE INVENTION

As shown in FIGS. 1A, 1B, 2A, and 2B, the device of the present invention is used in an information processing system which comprises two identical circuits (1), a main memory (12a) and a shared extended memory (12c). The first circuit is the master, the second circuit is the slave, and each circuit comprises at least one parallel/serial port. All ports (10) of each integrated circuit are identical.

The first object of the invention is achieved because; The process for initializing a serial link between two integrated circuits comprising an input-output port between a parallel bus and a serial link, this port using two clocks with different frequencies, a first high-frequency clock for the serial link, called a transmitting and receiving clock CKT/CKR, and a second lower-frequency clock for the signals arriving from the parallel bus of the system (CKS), is characterized in that it comprises the following steps:

reinitialization of the port with isolation of the receiving clock logic;

reinitialization of the transmitting clock logic (CKT) (parallel-serial);

reset-to-zero of the serial link between the two ports. According to another characteristic, the step for reinitializing the port comprises:

a step in which the microprocessor associated with the port to be reinitialized sends a series of neutral messages which allow a receiving delay line (LLR) to be calibrated to these neutral messages and to extract from them a receiving clock signal (CKR), then to send a signal (CAL) indicating that the receiving clock has been calibrated.

According to another characteristic, the microprocessor associated with the integrated circuit disconnects the parallel port, sending no data to the parallel bus that links it to this port;

the integrated circuit deactivates each of its serial outputs and sends a 0-volt signal, possibly mixed with noise;

the integrated circuit sets its token counter to zero in order to avoid sending messages and reinitializes all its pointers.

According to another characteristic, each of the preceding steps is repeated in each of the ports of each of the circuits connected by the serial link.

According to another characteristic, the steps for initializing the ports are followed by a step for initializing serial communication (MM).

According to another characteristic, this step for initializing serial communication comprises:

a step for establishing the master/slave link;

a step for establishing the slave/master link;

a step for connecting the parallel bus to the port of the master circuit;

a step for connecting the parallel bus to the port of the slave circuit.

According to another characteristic, the step for establishing the master/slave link comprises:

a step in which the processor of the card of the master circuit sets an input (OE) of the port to a value 1 and transmits a continuous flow of null characters;

a step for calibrating the receiving clock (CKR) of the port of the slave circuit; and a step for sending an interrupt to the microprocessor associated with the slave circuit;

a step for reinitializing the receiving clock logic of the slave circuit and sending two dummy messages to the receiving buffers of the port of the slave circuit;

a step for setting an input (OE) of the port of the slave circuit to the value 1; and a step for transmitting null characters for a sufficient length of time determined by a periodic sampling signal of the slave port.

According to another characteristic, the step for establishing the slave/master link comprises:

a step for calibrating the receiving clock (CKR) of the port of the master circuit and for setting the calibration signal of this port to the valve 1;

a step for sending an interrupt to the microprocessor associated with this master circuit;

a step for reinitializing the receiving clock logic of the port of this master circuit and for loading two dummy messages into the receiving buffers of the master circuit.

According to another characteristic, the step for connecting the parallel bus to the port comprises:

a step during which the microprocessor associated with the master circuit connects its parallel bus to the port of the master circuit;

a step for reading the dummy messages sent previously and for sending two tokens to the port of the slave circuit;

a step for the reception of the two tokens by the slave circuit; and a step for the sending by the latter of an interrupt to the associated microprocessor associated with the master circuit;

a step for connecting the parallel bus of the associated microprocessor to the slave circuit;

a step for reading the dummy messages; and a step for sending two tokens to the master circuit.

According to another characteristic, the tokens are generated by an operation for reading the dummy messages stored in the buffers (RCBUF) of the master port and slave port, respectively.

According to another characteristic, the detection of a calibration loss in either of the ports or a command for reinitializing the link triggers the following series of steps:

a step for isolating the receiving clock logic;

a step for deactivating the signal OE which, for the circuit having detected the calibration loss, results in the interruption of data transmissions to the remote receiving circuit;

a step for the detection of the calibration loss by the port of the remote receiving circuit; and a step for starting the procedure for isolating the receiving clock logic of this circuit.

Another object of the invention is a device which allows the process to be implemented.

This second object is achieved because of the fact that the device which allows the implementation of the process for initializing a serial link between two integrated circuits comprising an input-output port between a parallel bus and a serial link, this port using two clocks with different frequencies, a first higher-frequency clock for the serial link, called a transmitting/receiving clock, and a second lower-frequency clock for the signals arriving from the parallel bus, called a system clock or a low-frequency clock, is characterized in that it comprises:

means for reinitializing the port with isolation of the is, receiving clock logic;

means for reinitializing the transmitting clock logic;

means for resetting the serial link between the two ports to zero.

According to another characteristic, the device comprises means which allow the microprocessor associated with the port to be reinitialized to send a series of neutral messages which allow a receiving delay line to be calibrated to these neutral messages and to extract from them a receiving clock signal, then to send a signal indicating that the receiving clock has been calibrated.

According to another characteristic, the device comprises:

means allowing the microprocessor associated with the integrated circuit to disconnect the port, sending no data to the parallel bus that links it to this port;

means allowing the integrated circuit to deactivate its outputs and to send a 0-volt signal, possibly mixed with noise;

means allowing the integrated circuit to set its token counter to zero in order to avoid sending messages and to reinitialize all its pointers.

According to another characteristic, the device comprises means which make it possible to repeat each of the steps of the process in each of the ports of each of the circuits connected by the serial link.

According to another characteristic, the device comprises means which make it possible to follow the steps for initializing the ports with a step for initializing serial communication.

According to another characteristic, the device comprises:

means for establishing the master/slave link;

means for establishing the slave/master link;

means for connecting the parallel bus to the port of the master circuit;

means for connecting the parallel bus to the port of the slave circuit.

According to another characteristic, the device comprises:

means allowing the processor of the card of the master circuit to set an input of the port to a predetermined value and to transmit a continuous flow of idle signals;

means for calibrating the receiving clock of the port of the slave circuit;

means for sending an interrupt to the microprocessor associated with the slave circuit;

means for reinitializing the receiving clock logic of the slave circuit and for sending two dummy messages to the receiving buffers of the port of the slave circuit;

means for setting an input of the port of the slave circuit to the value 1; and means for transmitting null characters for a sufficient length of time and for validating a periodic recalibration signal of the slave port.

According to another characteristic, the device comprises:

means for calibrating the transmitting clock of the port of the master circuit and for setting the calibration signal of this port to the level 1;

means for sending an interrupt to the microprocessor associated with this master circuit;

means for reinitializing the receiving clock logic of the port of this master circuit and for loading two dummy messages into the receiving buffers of the master circuit.

According to another characteristic, the device comprises:

means through which the microprocessor associated with the master circuit connects its parallel bus to the port of the master circuit;

means for reading the dummy messages sent previously and for sending two tokens to the port of the slave circuit;

means for the reception of the two tokens by the slave circuit; and means for the sending associated with the master circuit an interrupt to the microprocessor;

means for connecting the parallel bus of the associated microprocessor to the slave circuit;

means for reading the dummy messages; and means for sending two tokens to the master circuit.

According to another characteristic, the means generate tokens via an operation for reading the dummy messages stored in the buffers of the master port and slave port, respectively.

According to another characteristic, the means for detecting a calibration loss in either of the ports or a command for reinitializing the link trigger:

means for isolating the receiving clock logic;

means for deactivating the signal which, for the circuit having detected the calibration loss, results in the interruption of data transmissions to the remote receiving circuit;

means for the detection of the calibration loss by the port of the remote receiving circuit; and means for starting the procedure for isolating the receiving clock logic of this circuit.

BRIEF DESCRIPTION OF THE DRAWINGS

Other characteristics and advantages of the present invention will emerge more clearly in the reading of the following description, given in reference to the appended drawings illustrating a non-limiting embodiment of the invention, in which:

FIG. 5 illustrates a cyclic permutation algorithm which may be used in the present invention for calculating CRC and updating $CRC_{N+1}$.

DESCRIPTION OF THE PREFERRED EMBODIMENT(s)

Figure 1A:
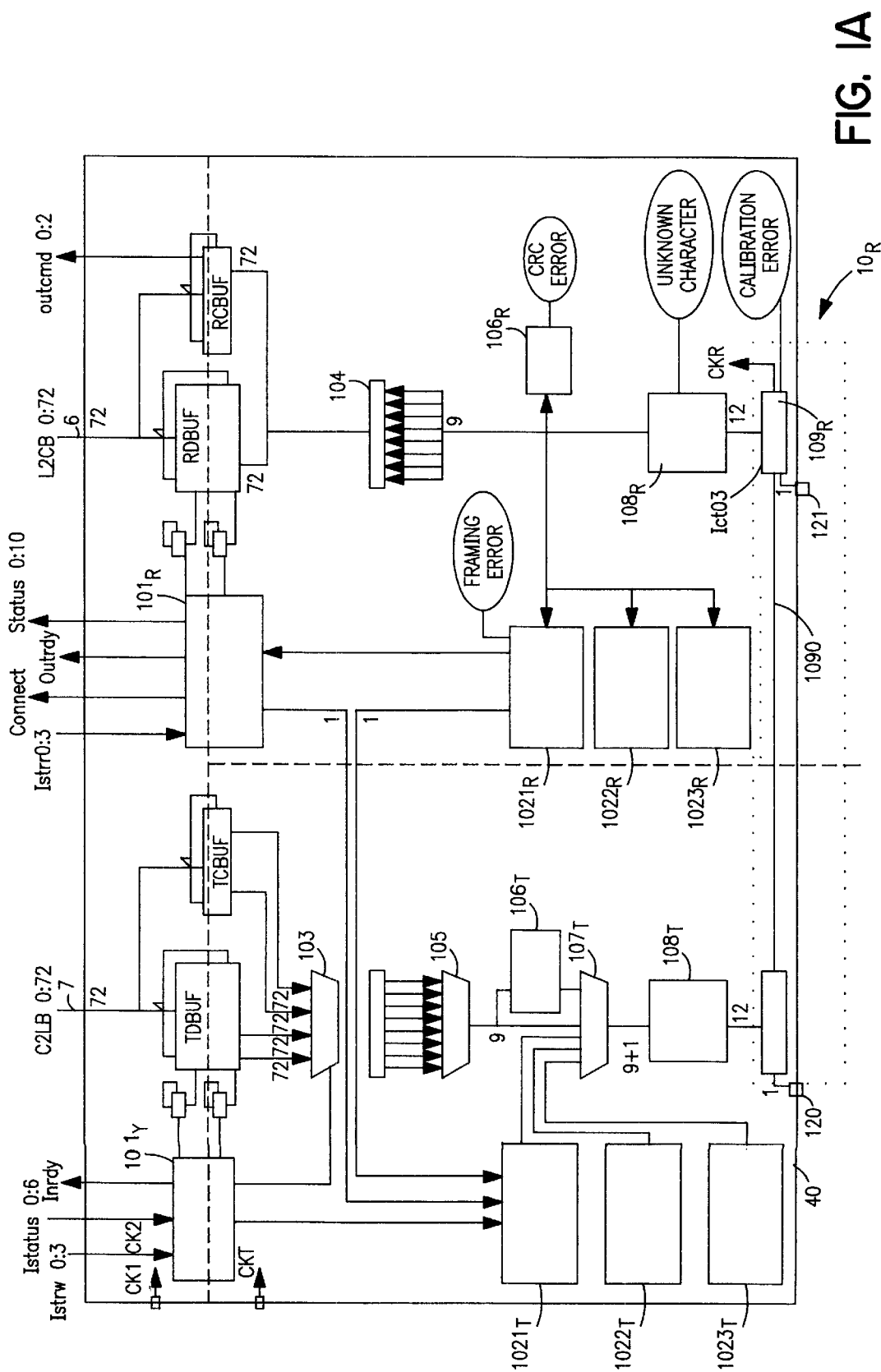
FIG. 1A represents the part of the integrated circuit constituting the serial-parallel interface port.
Figure 1B:
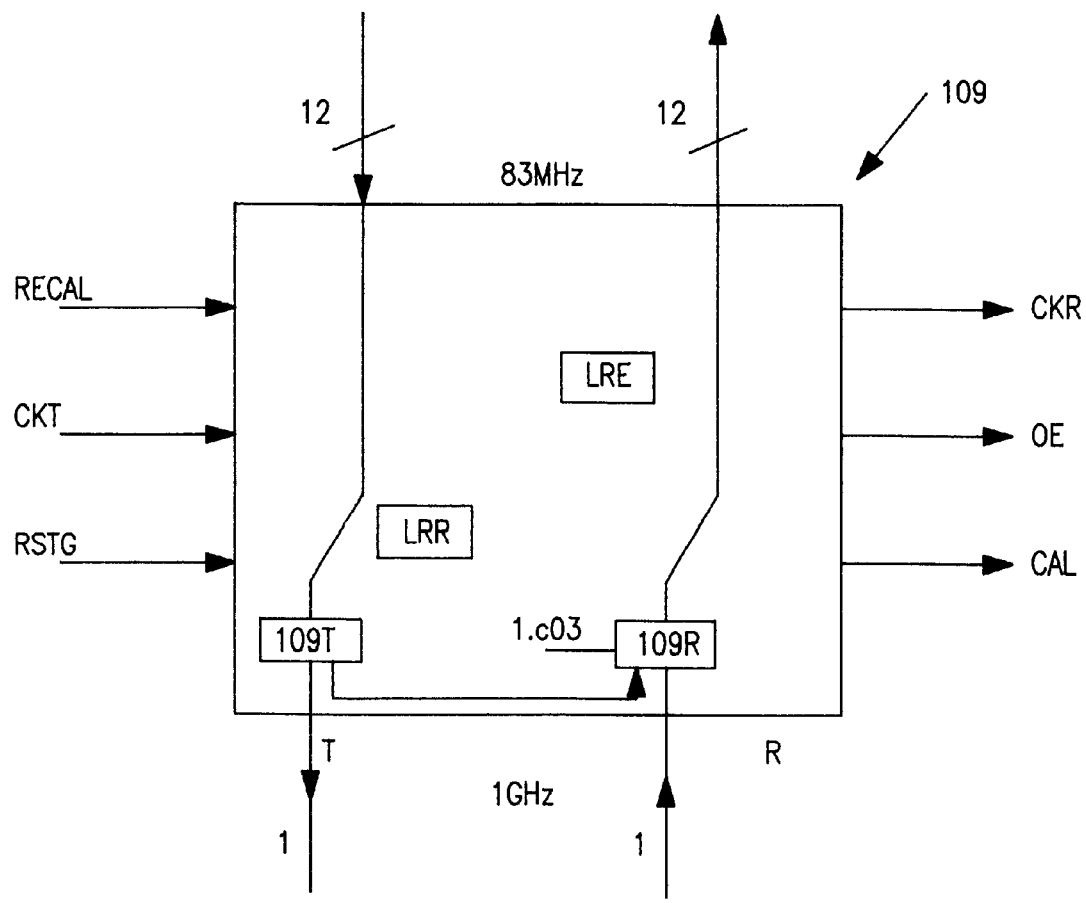
FIG. 1B represents a detail of the integrated circuit cell constituting the serializer/deserializer.
Figure 2A:
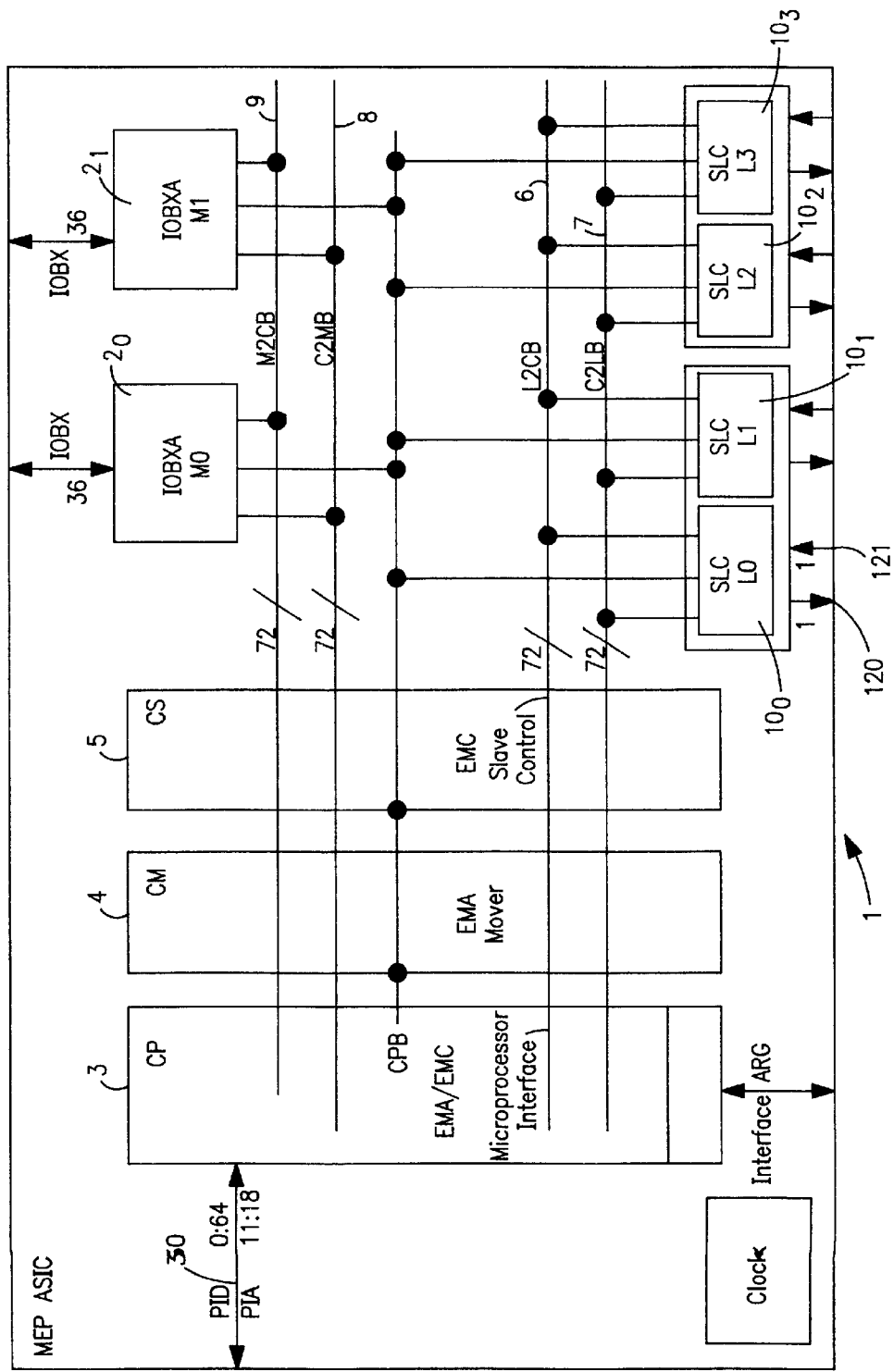
FIG. 2A represents an exemplary application of the serial-parallel input-output port of FIG. 1
Figure 2B:
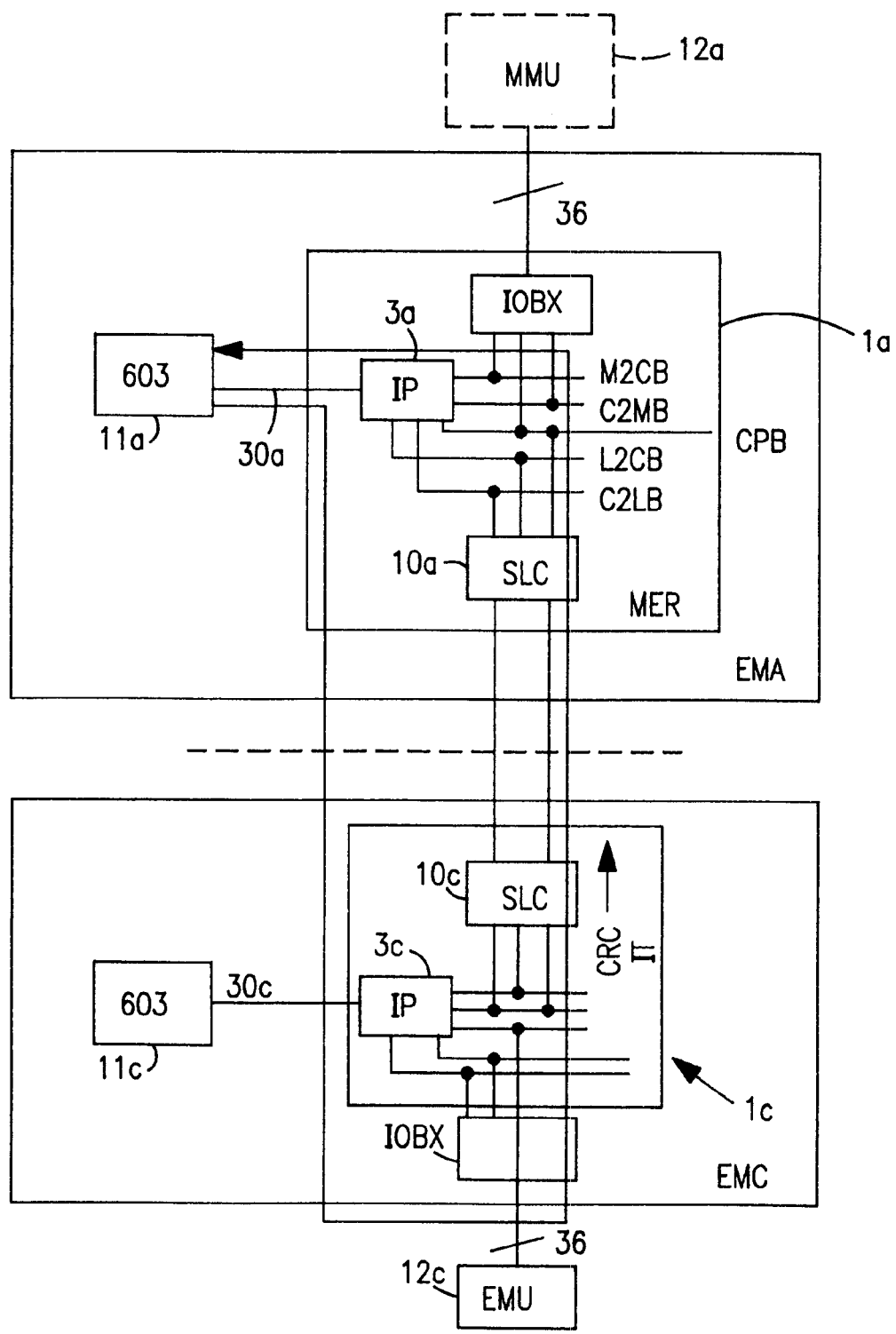
FIG. 2B represents the architectural diagram of a machine using an integrated circuit of this type.

Referring to FIG. 1A, the port $10_0$, known as the control block of the serial link SLC (Serial Link Control), is incorporated into an integrated circuit, for example of the type represented in FIG. 2A. This integrated circuit (1) comprises a plurality of ports $10_0$, $10_1$, $10_2$, $10_3$ of the same type as the one in FIG. 1 which communicate at a system frequency of, for example, 33 MHz with two parallel 72-bit data busses, L2CB for input (6) and C2LB for output (7). These parallel busses communicate with logic circuits performing for the the macroprocessor interface circuit (3) a functionality for interfacing with a microprocessor (11) through a 64-bit bus (30), for the mover circuit (4) a move functionality (MOVER) for the integrated circuit when the latter is incorporated into a data-type card, and for the slave control circuit (5) a memory control functionality (Slave Control). These circuits (3, 4, 5) also communicate through two 72-bit data busses M2CB (9), C2MB (8), with two input-output interfaces IOBX $2^0$, $2^1$ which allow communication with 36-bit busses issuing either from a main memory MMU (12a, FIG. 2B) or from an expanded memory EMU (12c) as represented in FIG. 2B. A control bus CPB allows the microprocessor (11) communicating with the integrated circuit (1) to access the control and status registers of the various circuits (3, 4, 5, 2, 10) present in the integrated circuit. This integrated circuit (1) is used in an information processing system or machine comprising a main memory (12a), and an expanded memory that can be shared by a plurality of systems (12c). A first Master integrated circuit (1a) according to the invention communicates through the bus (30) with a first processor (11a) and through the interface IOBX with the memory (12a), while a second slave integrated circuit (1c) communicates, on the one hand, with the first master circuit (1a), and on the other hand through the bus (30c) with a second processor (11c) and with an expanded memory (12c). The port (10a) for parallel-serial transmission and serial-parallel reception in the circuit (1a) comprises for the transmitting part a pair of 8×72-bit data buffers TDBUF connected to the transmitting bus C2LB. As shown in FIG. 1A, a multiplexer (103) makes it possible to select either of two buffers TDBUF, or the buffer TCBUF of control signals which contains the header. The information leaving the multiplexer (103) is sent through a disassembly circuit (105), which generates a sequence of 9 serial bits constituting the characters to be transmitted. This disassembly circuit (105) is also connected to a circuit for generating a cyclic redundancy check character CRC ($106_T$). A second multiplexer (107) makes it possible to select the signals transmitted to an encoder (108.) which allows the 9/12 encoding of the transmitted information by associating a check bit with the normal character formed by a nine-bit byte, and filling it out to 12 bits with a start bit and a stop bit. The 9/12 encoding is performed so that the signal transmitted through the serial link does not include any direct current component (DC balancing). The multiplexer (107) receives signals issuing from a transmitting status unit ($1021_T$) of the serial link comprising at least one 2-bit token counter, wherein each bit representing a token indicates the availability of the associated buffer. The multiplexer (107) receives signals issuing from a substitution status unit ($1022_T$), and signals issuing from a port initialization status unit ($1023_T$). The output from the encoder ($108_T$) is linked to a serializer circuit ($109_T$) whose output constitutes a serial line (120) which sends signals at a speed of, for example, 1 gigabit/sec.

The serializer is connected by a serial loop link (1090) to a deserializer ($109_R$) of the receiving circuit. of the port (100). This serial loop link (1090) is validated in the deserializer ($109_R$) by a signal (IctO3).

Each cell (109) for serialization ($109_T$)/deserialization ($109_R$) represented in FIG. 1b comprises three inputs, a first input being constituted by the transmitting clock signal CKT issuing from other parts of the integrated circuit (1).

A second input is constituted by the general reset signal RSTG that is sent to the integrated circuit (1) through the control bus (not represented) of the integrated circuit (1) by the microprocessor (11a) associated with the integrated circuit (1), as shown in FIG. 2b.

A third input is constituted by the signal RECAL for restarting the calibration of the receiving clock for the cell.

This cell (109) comprises two delay lines, one sending delay line (LRE), one receiving delay line (LRR). The cell (109) generates two signals, a first receiving clock signal CKR, and a second signal CAL indicating the calibration of the receiving clock signal (CKR).

Signal OE represents an output enable signal provided for validating the outputs.

The delay lines (LRE, LRR) of the circuit are used by the latter, when the receiving line receives idle signals (neutral messages/null characters) constituted by 6 bits at 1 and 6 bits at 0 causing its delay line (LRE, LRR, respectively) to vary, to calibrate the clock (CKT, CKR respectively). Thus, the transmitting clock (CKT) is adjusted to a value of 12 nanoseconds, which corresponds to a frequency of 83 megahertz, that is, the frequency of the sending of a 12-bit character, in order to allow the correct sampling of the information received in the 12-bit transmission line. The receiving delay line (LRR) makes it possible to calibrate the receiving clock CKR at 83 MHz (1000/12) by varying the delay line. The variation of the delay line is achieved by means of a mechanism DLL (Delay Lock Loop), which allows the calibration and makes it possible to adapt this calibration to slight changes in the received and transmitted signal; when the receiving clock has been successfully calibrated to the idle signals (neutral messages/null characters), the cell raises the output (CAL) to the active level.

The multiplexer (107) also receives the signals from a transmission status unit. Each transmitting buffer is controlled by a transmitting buffer management status unit ($101_T$) which receives Istatus 0:6, Istrw 0:3, and sends the signal Inrdy.

The deserializer ($109_R$) is connected to a decoder ($108_R$) which operates on the same principle as the encoder ($108_T$) of the transmitting circuit. This decoder of the receiving circuit sends the 9 bits of each datum to a data assembly circuit (104) for transforming the serially received data into 8×72-bit words, which are loaded into a pair of data receiving buffers (RDBUF) operating at a frequency of 83 MHz. This pair of data receiving buffers (RDBUF) is controlled by a receiving buffer management unit ($101_R$) and is associated with a pair of receiving control buffers (RCBUF) which contain the headers of the messages. The output from the decoder ($108_R$) of the receiving circuit is branched to a message verification code circuit, which generates a cyclic redundancy check character CRC ($106_T$) for comparison. The $CRC_{N+1}$ is updated after each reception of 9 data bits, by calculating the CRC in 16 bits using a cyclic permutation algorithm, represented in FIG. 5, on the values $X_i$ calculated from the data received $D_i$ and from the values $R_i$ of the bits of the previous CRCN, according to the formula given in FIG. 5. The information transmitted by this decoder ($108_R$) is also transmitted to a status unit constituting a history buffer ($1022_R$), to a status unit of the receiving port ($1021_R$), and to an initialization status unit ($1023_R$) of the port.

The receiving buffer management status unit ($101_R$) sends three signals (Connect, Outrdy, Status 0:10) and receives as input through three lines the information (Istrr 0:3).

The signal (Outrdy) indicates that the output is ready; this signal indicates that there is a complete message waiting to be read. The signal Status indicates the status of the outputs: whether or not they are interrupts, whether or not they are invisible operations, whether memory access or register access, local or remote, ISCON or non-ISCON, whether their source is the microprocessor, mover (MOVER) or slave (SLAVE), whether or not they are delayed responses, whether or not this is the last message, whether or not there is a data error, whether or not there is external memory access, and whether or not this is an insignificant message. The output Connect indicates that the port SLC (100) is disconnected when this output is deactivated. The inputs Istrr allow the reading of the receiving ports in FIFO order, and the command which reads the last double word of a message causes the generation of a flow control character (token) associated with the buffer, which thus becomes free. This flow control character is transmitted from the receiving buffer management status unit ($101_R$) to the transmission management status unit ($1021_T$), and through the latter to the multiplexer (107) in order to transmit this information to the input port (10c) of the card (1c) associated in the serial link with the receiving port ($109_R$) whose receiving buffers RDBUF have just been read. The transmitting buffer management status unit ($101_T$) comprises two inputs Istatus and Istrw, and one output Inrdy. This output Inrdy indicates that there is a free transmitting buffer TDBUF waiting to be written. The lines Istatus make it possible to specify the types of messages to be written, and to determine, as a function of the value of the first two status bits, the following indications: 00 no longer in use, 01 data only, 10 header, 11 header and data. The third bit Istatus indicates whether or not this is the last message. The fourth bit indicates whether or not there is a data error; and the fifth bit indicates whether or not there is external access to the memory.

Lastly, the signal Istrw makes it possible to write the transmitting buffers (TDBUF) in FIFO order. The signal Istrw which writes the last double word of a message, initializes the transmission of the message as soon as a remote receiving buffer (RDBUF) (for example of the port 10c) is declared to be free by a receiving port ($109_R$) connected to the serial link (120).

The history buffer (I-HB) has 16 inputs and contains either the last 16 characters that come from the serial link through the decoder ($108_R$) or the last 16 control characters, excluding the null characters. When an error occurs in the serial link, the write operation in the history buffer can be inhibited by a specific command, and the reading of the buffer is achieved by means of a pointer (PHB) which allows a cyclical scanning of the buffer controlled by the microprocessor (11). The control of the history buffer is carried out by a control register (ICL1) (FIG. 4B) linked to the control bus CPB.

The history buffer I-HB is accessible to the microprocessor (11a, 11c) through the control bus CPB. The control register ICL1 is connected to 2 filters (F1, F2). The first filter F1, when it has been activated by ICL1, allows only the control characters through, and when it has not been activated, is transparent. The second filter allows all the non-null characters through.

The substitution status unit ($1022_T$) (FIG. 4A) comprises a substitution buffer (I-sb) which has eight inputs, and its content is combined in an exclusive-OR (10221) with the outgoing stream (o-s) of characters to a length of 7 characters.

The substitution begins with the last character of an activation sequence. The character of the outgoing stream (o-s) corresponding to the last valid character of the transmitting buffer TDBUF is combined in an exclusive-OR gate with the first character of the substitution buffer (I-sb).

In an operation without substitution, the read pointer PL of the substitution buffer (I-sb) addresses the first character of the substitution buffer (I-sb). This character, which is null, when combined in the exclusive-OR (10221) with the characters of the stream (o-s), does not modify the latter, and the stream (o-s) is transmitted to the multiplexer (107).

An activation buffer (I-tb) with two inputs determines through its contents when the substitution burst starts. This buffer I-tb sends the activation sequence tc to an associated comparator (10222) which receives through its other inputs the outgoing stream (o-s). This starting instant is given when the activation sequence (tc) corresponds to the outgoing stream of characters (o-s).

In this case, the output (10224) of the comparator activates the incrementer (10223) of the read pointer PL in order to allow the simultaneous sending, with each new character of the outgoing stream, of a substitution character addressed within the 8 characters of the buffer I-sb by the read pointer.

Figure 4A:
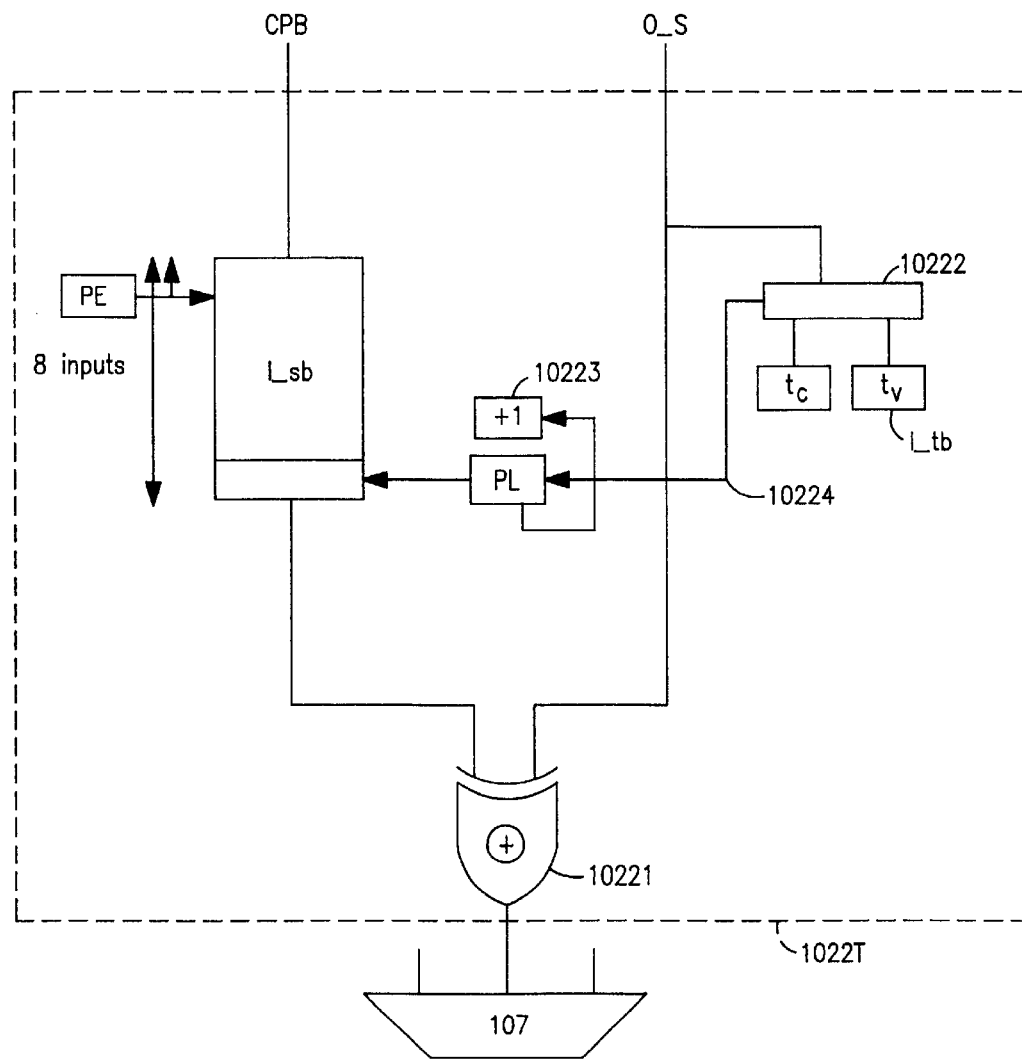
FIG. 4A represents an error character substitution circuit.
Figure 4B:
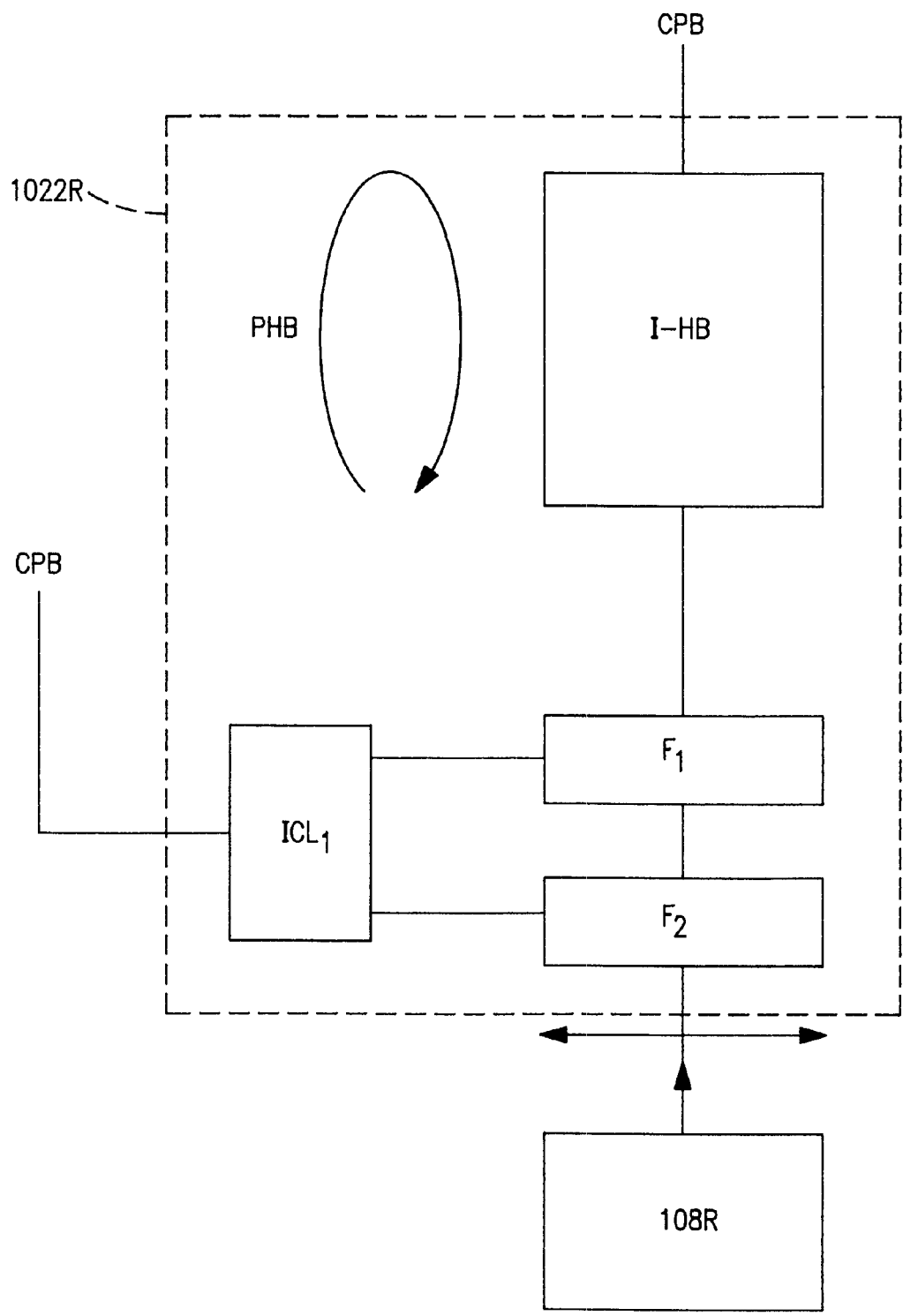
FIG. 4B represents a history circuit.

This activation buffer (I-tb) comprises a piece of information (tv) which participates in the comparison and which, when it has the value 00, indicates that it is not using substitution. In the case where the piece of information (tv) has the value 10, the length of the activation sequence is equal to 1. When tv is equal to 11, the length of the activation sequence is two characters. This substitution circuit is represented in FIG. 4A.

A write pointer PE accessible by the microprocessor (11a, 11c) through the bus CPB makes it possible to load the substitution characters into the substitution buffer through the bus CPB.

Thus, via the substitution circuit, errors are inserted at the desired moment, and through the circuit (CRC), these errors are detected. Therefore it is possible, by looping the port back to itself through the link (1090) and the command Ict03, to detect the correct functioning of the error detection circuits (CRC). When two ports (10a, 10c) are connected, as represented in FIG. 2B, these two ports being linked through the integrated circuits (1a, 1c) to respective microprocessors (11a, 11c), it is possible to implement an internal self-test comprised of the sending by the first processor (11a) of a 64-bit write request in which the correct CRC is stored.

The processor (11a) presets the error injection mechanism of the port (10a) and inserts a deliberately false control character (CRC) into the message. This character is transmitted by the port (10a) to the port (10c) of the slave integrated circuit (1c), which is also connected to a second processor (11c). This port (10c) detects a data error by calculating the CRC of the message received, which does not correspond to the erroneous CRC added by the insertion mechanism to the message received. This error detection generates the sending of an interrupt message to the sending circuit (1a), which is received by the processor (11a). This processor (11a) reads in the circuit of the second port (10c) the value CRC calculated from the transmitted data and deduces whether the circuit CRC has functioned correctly by verifying that the value CRC stored corresponds to the value CRC received.

Thus, it is understood that these simple-to-use mechanisms in the input-output port of an integrated circuit allow the detection of errors, and the verification of the correct functioning of the input-output port circuit in a high-speed serial link, thus ensuring the correction of the errors, even if the error rate is very low.

The pinpointing of errors is achieved by reading from the history buffer the characters that generated the error detection interrupt. This occurrence of errors also generates an interrupt of the communication link to the processor in order to prevent the propagation of the error in the machine. However, the problem in the transmissions is that the latter can include either errors or noise. The calibration can remain exact, but an error can occur and change a 0 into a 1, which will be interpreted as a calibration error by the cell (109). This necessitates the implementation of a procedure for initializing or reinitializing the serial communication established between the two devices EMA and EMC described below In these two devices, one of them, for example EMA and its processor (11a), will act as the master, while the other, the serial link controller SLC of the device EMC, will act as the slave.

Each serial link port can assume any of the following three states:
inconsistent;
ready for initialization;
operational.

The inconsistent state is the state which the serial link assumes after powering up or after a failure. The ready for initialization state is the state in which the two ports constituting the serial link are initialized, that is, after the initialization of the cards incorporating these ports. The operational state is the state in which the serial link is effective in each direction, and a continuous flow of null (idle) characters is sent, although no data is transmitted. In this operational state, the receiving clock is running.

The step for initializing the ports takes place in the following way:
reinitialization of the port by loading a register I-Control 0 7.2 with the value $1^1$, which results in isolating the receiving clock logic CKR of the circuit (109);
reinitialization of the transmitting clock logic CKT;
and reset-to-zero of the serial link (120, 121).

This is carried out by:
a—the microprocessor (11a) of the master card EMA which reinitializes the cell (109) by sending a sequence of null (idle) characters which, after approximately 2400 transmitting clock cycles (CKT), calibrates the serialization system;

b1—the microprocessor (11a) of the card EMA disconnects the circuit SLC (10a), sending no data through the bus C2LB;

b2—the integrated circuit (1a) of the card EMA deactivates the serial link, which is in error, and then sends 0 volts, possibly with noise, through the serial link in error;

b3—the integrated circuit (1a) of the card EMA sets its token counter to zero, which prevents it from sending messages;

b4—the card EMA reinitializes all the pointers of the circuit SLC. The latter in turn reinitialize the status errors and the interrupt causes, then b5—EMA transmits the null characters/neutral (idle) messages.

For its part, the processor (11c) of the card EMC carries out the same step for initializing the port (10c), which includes the same operations (a, b1, b2, b2, b4, b5), plus an operation c' for validating the signal RECAL, which allows a periodic retry of the recalibration of the cell (109) when the calibration has not worked for reasons such as the reception of noise through the line, which does not allow the clock to be calibrated.

At this moment the transmitting circuits of the master card EMA and the slave card EMC are calibrated. The slave card EMC is periodically ready for calibration on reception. No signal is sent through the serial link. The card EMA waits for a link initialization (represented by the state 2 RDY in FIG. 3). EMC is in the idle state so that its receiving circuit can be calibrated, which corresponds to the state WTCAL in FIG. 3A.

These steps for initializing the ports continue with a procedure for initializing the serial communication itself.

This procedure continues with the sending of a command I-Control 0 7:2=1, which indicates for the integrated circuit an order to start the next phase (Start next).

The initialization of the serial link comprises:
a step d (FIGS. 3A, 3B) in which the processor (11a) of the master card EMA sets the input OE (output Enable) of the circuit (109) in FIG. 1B and transmits a continuous flow of null (idle) characters;

a step e1 in which the port (10c) of the slave card EMC after the reception of a certain number of null characters through the line succeeds in calibrating its receiving clock CKR and setting its output CAL to "1";

a step e2 in which the circuit SLC of the slave card EMC sends an interrupt to the microprocessor (11c) and invalidates the signal RECAL because the receiving circuit of the block SLC (10c) has already been calibrated;

a step e3 in which the processor (11c) connected to the card EMC reinitializes the receiving clock logic CKR and during which two dummy messages are loaded into the receiving buffers RDBUF of the circuit (10c) of the slave card;

a step f1 during which the microprocessor (11c) of the card EMC sends to the circuit (1c) and to the port block (10c) of the integrated circuit (1c) a command setting the input OE to the value 1 and transmits a series of null characters for a sufficient length of time on the order of 3,500 signals.

The process (FIG. 3B) then proceeds to step g1, in which after the reception of the null characters, the clock CKR of the port (10a) of the master card EMA is calibrated and the calibration signal CAL is set to the value 1. The port (10a) of the circuit (1a) of the master card EMA sends, in step g2, an interrupt to the microprocessor (11a) of the card EMA, and the latter invalidates the signal RECAL in step g3, since the receiving port of EMA has already been calibrated.

The process continues with step g4, during which the master card EMA reinitializes the receiving clock logic CKR and loads two dummy messages into the receiving buffers RCBUF of the circuit (b1a) of the card EMA.

Figure 3A:
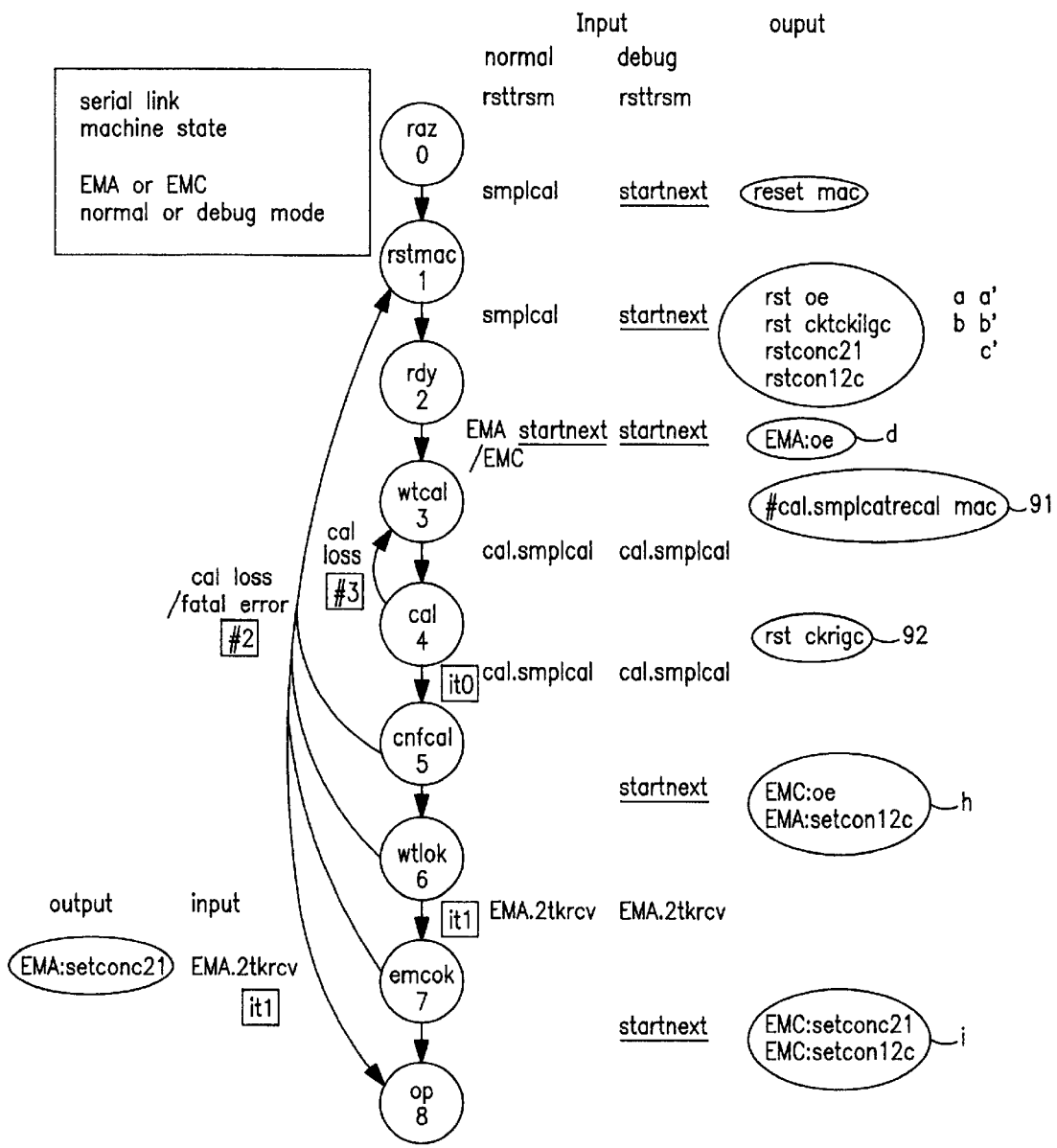
FIG. 3A represents the various steps of the procedure for initializing a serial link between two ports belonging to different cards.
Figures 3B, 3C:
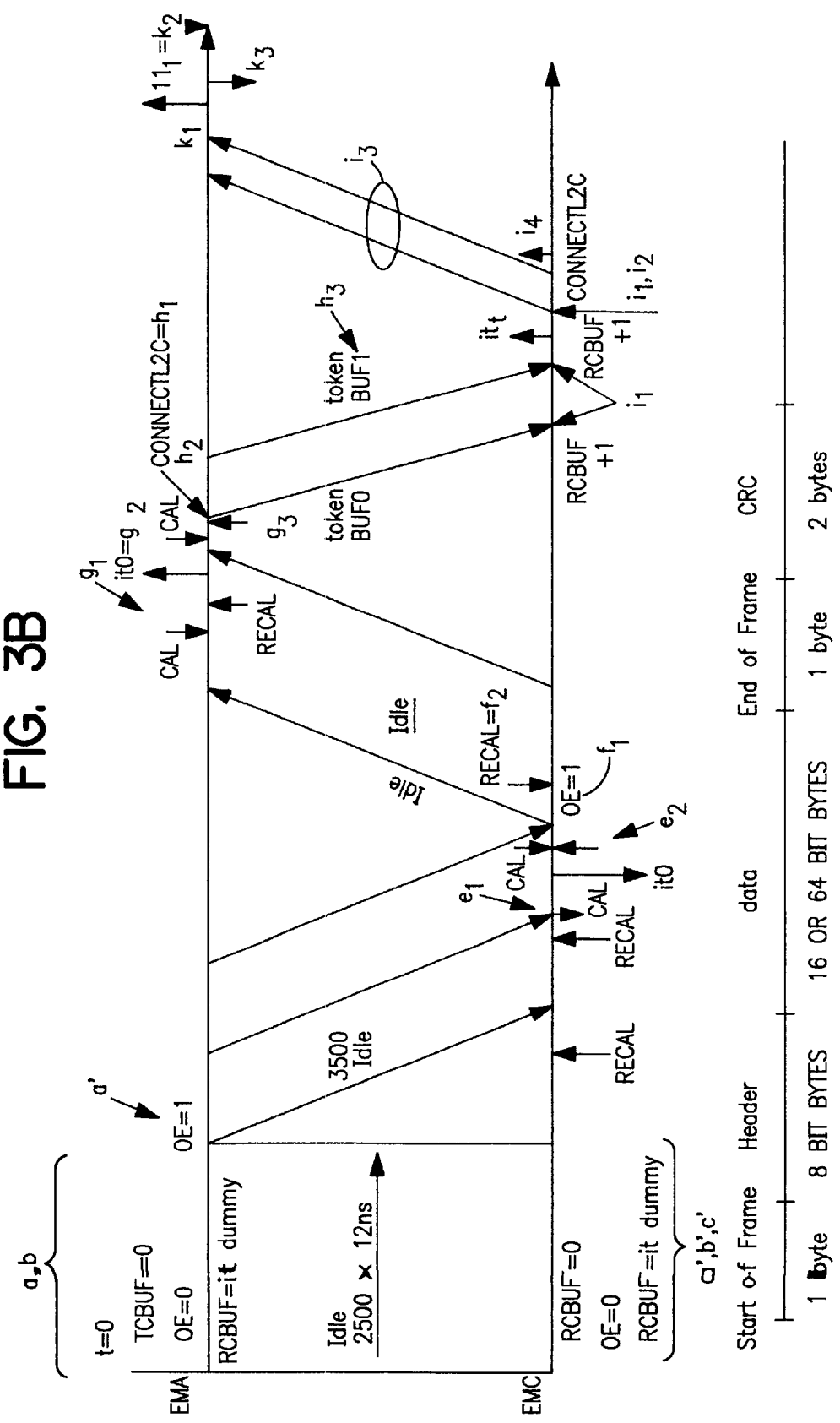
FIG. 3B is another representation of the initialization procedure between two ports.
FIG. 3C represents the structure of a message sent through the serial link.

The process continues with step h1, during which the microprocessor (11a) of the master card EMA connects the bus L2C to the circuit SLC, as represented in step 5 of the flow chart in FIG. 3a. The microprocessor (11a) reads the dummy messages in step h2 and sends two tokens to the port of the card EMC. These tokens are generated by an operation for reading the two dummy messages stored in the buffers RDBUF of the port (10a).

The process continues with step i1, in which the circuit (10c) of the slave card EMC receives the two tokens; then in step i2, the circuit EMC sends an interrupt (IT1) to the microprocessor (10c).

The process continues with step j1, during which the microprocessor of the slave card EMC connects the busses L2C and C2L, as represented in steps 7 and 8 of the flow chart in FIG. 3A. Then the card EMC, in step j2, reads the dummy messages, and in step j3 sends two tokens to the card EMA; these tokens are generated by the reading of the two dummy messages. The microprocessor (11c), in step j4, sets the state of the circuit (10c) of the slave card EMC to the operational state. The two tokens are stored in its token counter and each time they allow the processor associated with the integrated circuit to know the state of the transmission lines and the availability of either of the buffers.

The process continues further with step k1, during which the card EMA receives the two tokens in its token counter, and in step k2, this card sends an interrupt IT1 to the microprocessor (11a) of the master machine; then in step k3, the microprocessor sets the state of the circuit (10a) of the master card EMA to the operational state.

Finally, in the case where after 15,000 transmitting clock cycles CKT, the microprocessor has not received the interrupt IT1 in step k2, it deduces from this that the automatic initialization of the serial link has failed.

The port initialization status unit (1023) comprises a 3-bit status register I-Control 0 6:3, in which 6 of the possible values expressed by the three bits indicate:

for the first value, that the port SLC is disconnected from L2CB;

for the second value, that the flow control token counter is set at zero;

for the third value, that the serial link cell (109) has been reinitialized and that its output OE has been invalidated;

for the fourth value, that the periodic recalibration has been validated in the other port of the slave card EMC;

for the fifth value, that the receiving clock logic CKR has been isolated from the transmitting clock logic CKT in order to prevent interference with the other parts of the serial link control circuit (10a) when the receiving clock is not functioning correctly;

for the sixth value, the reinitialization of the transmitting clock logic and of all the buffer pointers, the status errors and the interrupt causes.

Thus, with this initialization process, it is possible, as a result of simple mechanisms at the level of the integrated circuit and the microprocessor, to be certain that the link has been established correctly. At the level of the initialization of the link, it is possible to detect as an error, a calibration error when the signal CAL is equal to 0.

Figure 3D:
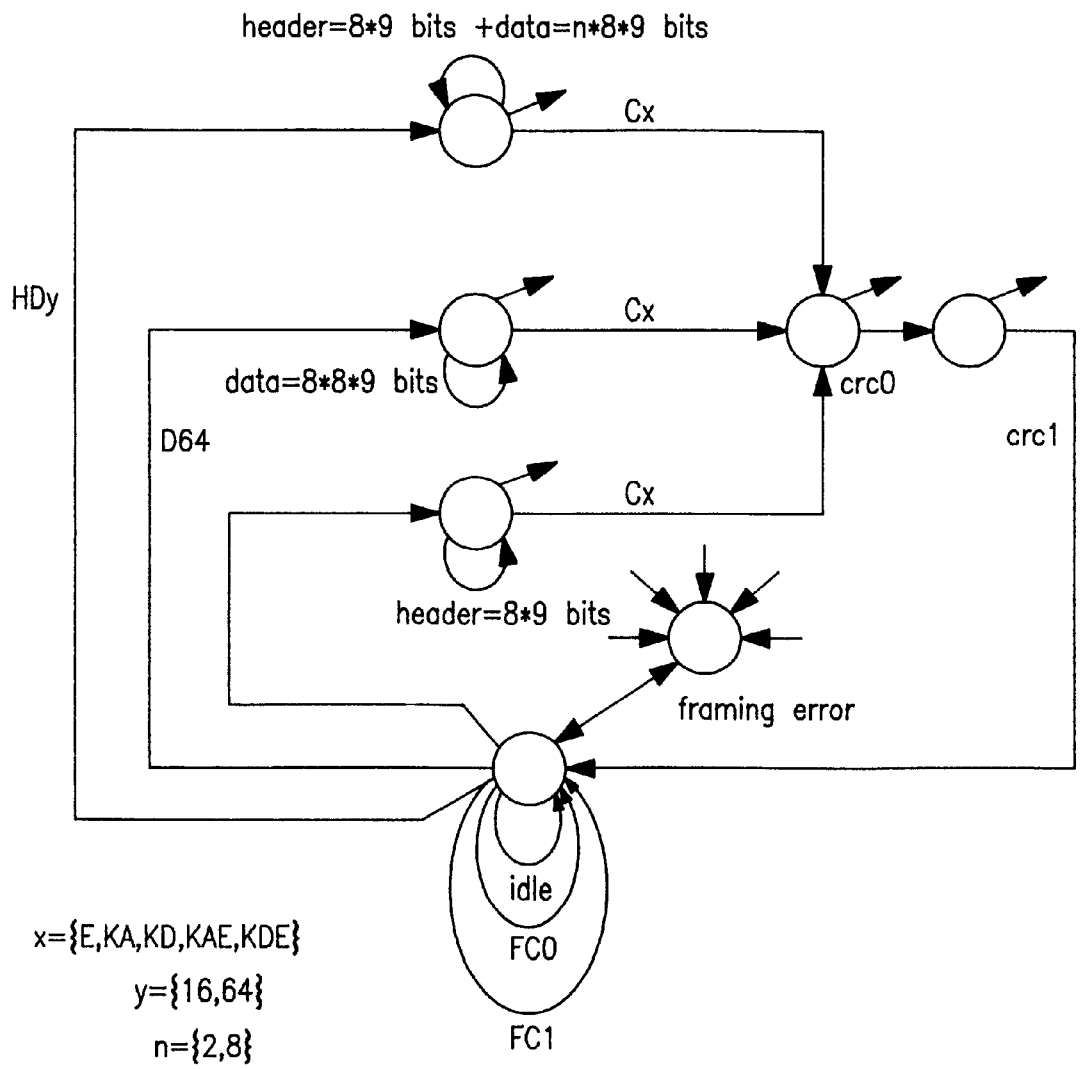
FIG. 3D represents the frame control logic diagram.

Another error detection source is the value of the tokens, which must alternate between the token 0 of the buffer 0 and the token 1 of the buffer 1 on each end of the serial link. If this is not the case, it shows that there is a problem. Another error source can be detected by the frame control character if, for example, in the start of frame, there is an unknown or unexpected character or an absence of an end of frame. Finally, a last error cause is an error detected in the control character CRC, as represented in FIG. 3D.

A calibration loss or a fatal error in the serial communication generates an interrupt IT2 and results in the execution of the processing mechanism below. A detection of a calibration loss in either of the ports (10a, 10c), or a command for reinitializing the link, by the associated microprocessor triggers the following mechanism, either in the master card EMA or in the port of the slave card EMC.

A first step a'' is for isolating the receiving clock logic. In that case, the situation is the same as in step a for the master card EMA or a' for the slave card EMC, which means that for the card that has detected a calibration loss or a fatal error, the signal OE (Output Enable) is deactivated, and no data is transmitted to the respective remote receiving circuit EMC or EMA. Since no data is transmitted, the remote receiver itself also detects a calibration loss and its microprocessor starts the symmetrical procedure, also isolating the receiving clock logic.

From this state, the two ports of the master and slave circuits are in the same position and must both be reinitialized according to the procedure provided, which is summarized below:

calibration of the receiving port of the slave card EMC and sending of an interrupt to the microprocessor (11c);

calibration of the receiving port of the master card EMA and sending of an interrupt to the master microprocessor (11a), and reading of the two dummy messages. Upon reception of the two flow control characters, the receiving port of the slave card EMC sends an interrupt to its microprocessor (11c), and reads the two dummy messages. Upon reception of the two flow control characters by the port of the master card, the latter sends an interrupt to its microprocessor (11a).

Thus, this simple mechanism ensures that the link is placed in the operational state, although it is understood that in case of a calibration loss resulting from a bad reception through the serial link, the system will propagate this error in the port located at the other end of the link and will restart with an initialization procedure on a normal basis.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for initializing a serial link between two integrated circuits including an initialized input-output port associated with each integrated circuit and connected between a parallel bus and a serial link, said port using two clocks with different frequencies, a first high-frequency transmission clock for the serial link, CKT/CKR and a second lower-frequency system clock for the signals arriving from the parallel bus, (CKS), comprising the following steps: reinitializing each port with isolation of the lower-frequency clock logic;

reinitializing a transmitting clock logic (CKT); and resetting of the serial link between the two ports to a zero value.

2. The process according to claim 1, wherein the step for reinitializing the port comprises:

sending a series of neutral messages by a microprocessor associated with the port to be reinitialized, calibrating a receiving delay line (LLR) to said neutral messages and extracting from the neutral messages a receiving clock signal (CKR), and sending a calibration signal (CAL) indicating that the receiving clock has been calibrated.

3. The process according to claim 1, further comprising disconnecting the parallel port of the microprocessor associated with the integrated circuit so that no data is sent to the parallel bus that links said bus to said port;

deactivating serial output of the integrated circuit and sending a 0-volt signal; and setting a token counter in the integrated circuit to zero to avoid sending messages and reinitializing all pointers of the counter.

4. The process according to claim 2, wherein each of the preceding steps is repeated in each of the ports of each of the circuits connected by the serial link.

5. The process according to claim 4, wherein the steps for initializing the ports are followed by a step for initializing serial communication.

6. The process according to claim 5, wherein the step for initializing serial communication comprises:

a step for establishing a master/slave link;

a step for establishing a slave/master link;

a step for connecting the parallel bus to a port of a master circuit; and a step for connecting the parallel bus to a port of a slave circuit.

7. The process according to claim 6, wherein the step for establishing the master/slave link comprises:

a step in which the microprocessor of the card of the master circuit sets an input signal OE of the port to a value 1 and transmits a continuous flow of null characters;

a step for calibrating the receiving clock of the port of the slave circuit; and a step for sending an interrupt to the microprocessor associated with the slave circuit;

a step for reinitializing a receiving clock logic of the slave circuit and sending two dummy messages to receiving buffers of the port of the slave circuit;

a step for setting an input signal OE of the port of the slave circuit to the value 1; and a step for transmitting neutral messages/null characters for a sufficient length of time determined by a periodic sampling signal of the slave port.

8. The process according to claim 6, wherein the step for establishing the slave/master link comprises:

a step for calibrating the receiving clock of the port of the master circuit and for setting the calibration signal of this port to the value 1;

a step for sending an interrupt to the microprocessor associated with the master circuit; and a step for reinitializing the receiving clock logic of the port of the master circuit and for loading two dummy messages into the receiving buffers of the master circuit.

9. The process according to claim 6, wherein the step for connecting the parallel bus to the master circuit port comprises:

a step during which the microprocessor associated with the master circuit connects its parallel bus to the port of the master circuit;

a step for reading the dummy messages sent previously and for sending two tokens to the port of the slave circuit;

a step for the reception of the two tokens by the slave circuit;

a step for the master circuit sending an interrupt to the associated microprocessor;

a step for connecting the parallel bus of the associated microprocessor to the slave circuit;

a step for reading the dummy messages; and a step for sending two tokens to the master circuit.

10. The process according to claim 9, wherein the tokens are generated by an operation for reading the dummy messages stored in buffers of the master port and slave port, respectively.

11. The process according to claim 1, wherein upon detection of a calibration loss in either of the ports or a command for reinitializing the serial link triggers the following series of steps:

a step for isolating the receiving clock logic;

a step for deactivating a signal OE which, for the circuit having detected the calibration loss, results in the interruption of data transmissions to the remote receiving circuit;

a step for the detection of the calibration loss by the port of the remote receiving circuit; and a step for starting the procedure for isolating the receiving clock logic of this circuit.

12. A device for implementing a process for initializing a serial link between two integrated circuits comprising:

an initialized input-output port associated with each integrated circuit connected between a parallel bus and a serial link, each said port using two clocks with different frequencies;

a first higher-frequency transmitting/receiving clock associated with the serial link;

a second lower-frequency system clock (CKS) for signals arriving from the parallel bus;

means for reinitializing each port with isolation of the receiving clock logic;

means for reinitializing the transmitting clock logic; and means for resetting the serial link between the two ports to zero.

13. The device according to claim 12, wherein said means for reinitializing each port allows the microprocessor associated with the port to send a series of neutral messages which allow a receiving delay line to be calibrated to these neutral messages and to extract from them a receiving clock signal, then to send a calibration signal indicating that the receiving clock has been calibrated.

14. The device according to claim 12, further comprising:

means for allowing the microprocessor associated with the integrated circuit to disconnect the port so that no data is sent to the parallel bus that links said bus to said port;

means for allowing the integrated circuit to deactivate integrated circuit outputs and to send a 0-volt signal; and means for allowing the integrated circuit to set a token counter in the integrated circuit to zero in order to avoid sending messages and to reinitialize all pointers of the counter.

15. The device according to claim 13, further comprising means for repeating each of the process steps in each of the ports of each of the circuits connected by the serial link.

16. The device according to claim 15, further comprising means for following the steps for initializing the ports with a step for initializing serial communication.

17. The device according to claim 16, further comprising:

means for establishing a master/slave link;

means for establishing a slave/master link;

means for connecting the parallel bus to a port of a master circuit; and means for connecting the parallel bus to a port of a slave circuit.

18. The device according to claim 17 further comprising:

means for allowing the microprocessor of the card of the master circuit to set an input of the port to a predetermined value and to transmit a continuous flow of null characters;

means for calibrating the receiving clock of the port of the slave circuit;

means for sending an interrupt to the microprocessor associated with the slave circuit;

means for reinitializing a receiving clock logic of the slave circuit and for sending two dummy messages to receiving buffers of the port of the slave circuit;

means for setting an input of the port of the slave circuit to the value 1; and means for transmitting null characters for a sufficient length of time and for validating a periodic recalibration signal of the slave port.

19. The device according to claim 16, further comprising:

means for calibrating the receiving clock of the port of the master circuit and for setting the calibration signal of said master circuit port to the value 1;

means for sending an interrupt to the microprocessor associated with the master circuit; and means for reinitializing the receiving clock logic of the port of the master circuit and for loading two dummy messages into receiving buffers of the master circuit.

20. The device according to claim 16, further comprising:

means through which the microprocessor associated with the master circuit connects the parallel bus to the port of the master circuit;

means for reading the dummy messages sent previously and for sending two tokens to the port of the slave circuit;

means for receiving the two tokens by the slave circuit; and means for the master circuit sending an interrupt to the associated microprocessor;

means for connecting the parallel bus of the associated microprocessor to the slave circuit;

means for reading the dummy messages; and means for sending two tokens to the master circuit.

21. The device according to claim 20, further comprising means for generating tokens via an operation for reading the dummy messages stored in the buffers of the master port and slave port, respectively.

22. The device according to claim 18, further comprising means for detecting a calibration loss in either of the ports or a command for reinitializing the link trigger:

means for isolating the receiving clock logic;

means for deactivating the signal which, for the circuit having detected the calibration loss, results in interruption of data transmissions to a remote receiving circuit;

means for the detection of the calibration loss by the port of the remote receiving circuit; and means for starting a procedure for isolating the receiving clock logic of the circuit.

* * * * *

UNITED STATES PATENT AND TRADEMARK OFFICE
CERTIFICATE OF CORRECTION

PATENT NO. : 6,202,108 B1
DATED : March 13, 2001
INVENTOR(S) : Autechaud et al.

It is certified that error appears in the above-identified patent and that said Letters Patent is hereby corrected as shown below:

<u>Title page,</u>
Item [30], Foreign Application Priority Data, insert
-- February 19, 1997 (FR) ………..97 01944 --; and
-- February 19, 1997 (FR) ………..97 01945 --;

Signed and Sealed this

Tenth Day of September, 2002

Attest:

Attesting Officer

JAMES E. ROGAN
Director of the United States Patent and Trademark Office